United States Patent

Longhini

[15] 3,667,157

[45] June 6, 1972

[54] APPARATUS FOR THE HYDROPONIC CULTIVATION OF VEGETABLES

[72] Inventor: Fernando Longhini, Genzano, Italy
[73] Assignee: Aeroponica S.p.A., Rome, Italy
[22] Filed: Apr. 23, 1970
[21] Appl. No.: 31,293

[30] Foreign Application Priority Data

Apr. 26, 1969 Italy..................................36721 A/69
May 24, 1969 Italy..................................37384 A/69

[52] U.S. Cl.....................................47/1.2, 47/34.12, 47/35
[51] Int. Cl........................................................A01g 31/02
[58] Field of Search.............47/1.2, 17, 34, 34.12, 38–38.1, 47/35, 39

[56] References Cited

UNITED STATES PATENTS

| 2,244,677 | 6/1941 | Cornell | 47/17 |
| 3,172,234 | 3/1965 | Eavis | 47/1.2 |
| 3,254,448 | 6/1966 | Ruthner | 47/1.2 |
| 3,362,106 | 1/1968 | Goldring | 47/38 X |
| 3,365,840 | 1/1968 | Cooper | 47/34.12 |

FOREIGN PATENTS OR APPLICATIONS

| 1,491,459 | 7/1967 | France | 47/1.2 |
| 1,150,840 | 1/1958 | France | 47/39 |
| 1,480,721 | 4/1967 | France | 47/1.2 |

*Primary Examiner*—Robert E. Bagwill
*Attorney*—Guido Modiano and Albert Josif

[57] ABSTRACT

Apparatus for the hydroponic cultivation of vegetables including substantially horizontal tubular structures for holding therein transplanted plants. The tubular structure is made of a trough-like member and lid members of elastically flexible material, yieldably closing the troughlike member and clamping the plant between contacting edges of the lids. The tubular structure is removable suspended on vertically movable vertical ropes guided by a system of pulleys.

5 Claims, 3 Drawing Figures

INVENTOR.
FERNANDO LONGHINI
BY
Albert Josif
AGENT

APPARATUS FOR THE HYDROPONIC CULTIVATION OF VEGETABLES

BACKGROUND OF THE INVENTION

The present invention relates to an apparatus for hydroponic cultivation of vegetables held in a suspended condition and variously rearranged during vegetation thereof.

A process for cultivating vegetables in a so-called hydroponic manner, where the root system is supported in an inert "sub-layer" and subsequently irrigated with nutrient water solutions, is already known.

Also known is to arrange plants along superimposed raws to solve space problems. Furthermore it is known to spray or irrigate the said sub-layer at intervals in order to effect a rational and economic nourishing.

In the known hydroponic cultivating processes, however, the root system always necessitates suitable mechanical support means which forms the said sub-layer contained in containers adapted for marketing particularly in connection with nursery plants.

On the other hand, each single plant requires, as known, a specific "solar charge" (this term means here the pre-established time period of direct exposure to the sun light in order to permit the natural pollination of the flowers, when the cultivation is effected to obtain the plant fruit). This "solar charge" is a fraction, however, of the whole vegetation period. Also when operating in a greenhouse the vegetation period depends upon more direct exposure conditions and thus to positioning conditions with respect to areas through which the solar beams penetrate the greenhouse, furthermore on shade or suitable aeration conditions which may be affected by certain positions with respect to other plants or structural elements of a greenhouse.

Finally it is known that in the so-called hydroponic conditions, in order to cause the nutrient irrigating solution to reach the root system layers of very large area and outer volume are to be impregnated.

SUMMARY OF THE INVENTION

An object of the present invention is that of providing an apparatus where the nourishing irrigation solution is not hindered by obstacles, surfaces and waste impregnation volumes from directly reaching the root system.

Another object of the present invention is that of providing positioning criteria for the plants being grown arranged deliberately to position the single rows of the plants being cultivated as a function of the time, i.e., the progressive period of vegetation.

Another object of the invention is that of providing an apparatus for hydroponic cultivation of vegetables simple to manufacture, easy to maintain and quick and effective to operate for effecting the various operational cultivation steps as far as both the agricultural aspects such as the transplanting and the harvesting, and the controls (such as environment, phytosanitary, good intermittent irrigation conditions and the like) are concerned.

According to the invention an apparatus for the hydroponic cultivation of vegetables comprises tubular structures and means for feeding a nourishing irrigation or spraying fluid and is characterized in that each tubular structure includes a lower trough-like rigid portion and an upper lid portion formed with a longitudinal opening along the length of the tubular structure and confined at both sides by resiliently deformable material portions, in such a manner that a transplanted plant is clamped under low pressure due to deformations in the zones confining the said opening extending lengthwise.

More particularly the apparatus according to the invention comprises elements which can be moved up and down, and support means for said tubular frame members anchored to the said elements.

BRIEF DESCRIPTION OF THE DRAWINGS

Further characteristic features and modifications will better appear from the following description of a preferred but not exclusive embodiment illustrated by way of example in the accompanying drawings in which.

DESCRIPTION OF THE PREFERRED EMBODIMENTS

Figures 1, 2:
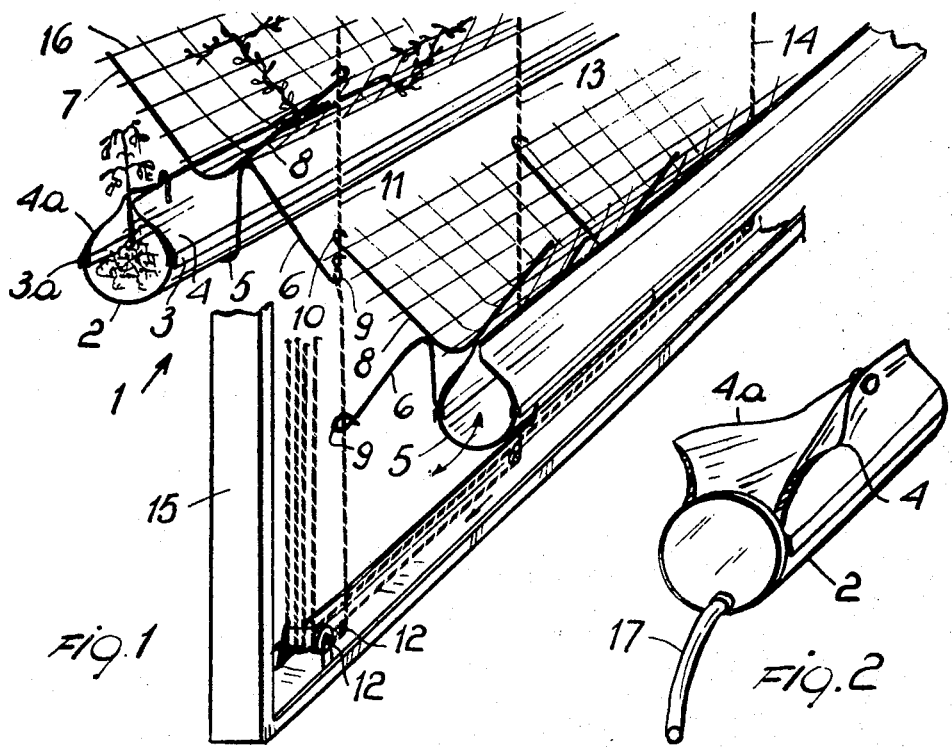
FIG. 1 is a perspective view of an apparatus according to the invention with portions omitted and partially in section.
FIG. 2 shows a tubular structure in a perspective view, having zones of resiliently deformable material suitably deformed to permit transplantation.

With reference to such figures the apparatus comprises tubular structures generally indicated at 1 including a substantially semicylindrical trough-like lower member 2 consisting of rigid material such as a plastics material resistant to chemical action of acid solutions.

Inserted into each of the longitudinal, substantially parallel, spaced apart edges of such semi-cylindrical or trough-like member 2 are forked ends or rims 3, 3a of lid members or wings 4, 4a which in cross-section have a thickness (from 2.5 mms. at the ends 3, 3a to 0.5 mms. at the free ends) gradually decreasing towards the upper free ends, thus being easily deformable at the latter ends. Such lid members or wings consist of a resiliently deformable or yieldable material such as a plastics material, and define therebetween an opening or split extending lengthwise with respect to each tubular structure 1 along a geometrical generatrix of such frame, considered as an ideally cylindrical member (it should be noted, however, that the shape is not necessarily circular in cross-section, but all comparable shapes may be used). The wings 4, 4a may also be provided rigid with the members 2.

It should be noted, however, that the said wings have a length longer than that of the complementar arc of a circle would have with respect to the semi-cylindrical shape of the base member 2, thereby the said wings come to yieldably rest one against the other at their free ends like lips, so as to yieldably upwardly close the trough-like member.

The tubular structures 1 are supported by bracket-like support means consisting of metal or plastics wires having a semi-circular portion 5, from which an oblique extension 6 slopes downwardly the whole being connected at the top thereof to wire-elements 7, 8 in the shape of a stretched V-antenna.

The free ends of the extension 6 and the V-antenna like wire element 8 are suitably hook-bended as indicated at 9 and 10 opposite to one another and are hooked to a substantially vertical cable or rope e.g. of plastics material. It was found in fact that the opposite hook configuration, the size of the gap between opposite sides of at least one of the hooks, which size is maintained quite close to that of the respective rope diameter, and the slope of the support element due to the weight of the tubular structure supported thereby, allow the support system to be firmly hooked to the relative rope.

As may be seen in FIG. 1, such support systems are provided on each rope in a multiple number at different height, e.g. three at one side and three at the other, for an average rope height of about 2 ms. Three of such tubular structures may thus be supported at each side. The ropes can be moved upwardly and downwardly. The said ropes in fact, which are generally indicated at 11, are wound around pulleys 12 thus forming a pulley system. In practice a suitable number of ropes such as three ropes indicated at 11, 13 and 14, as well as respective pulley to form a pulley system, may be provided.

An upright 15 vertically extends close to the pulley systems to give a support means for the pulleys and an anchoring means for securing the apparatus to the ground where a plant has to be established. Such upright is a portion of a frame consisting of U-shaped structural elements defining uprights and cross members. The cables or ropes run along such U-shaped profile.

The V-shaped elements indicated at 7 and 8 support a net 16 also substantially V-bended and consisting of metal or other material which is designed to hold and support the progressingly growing little plants one towards one arm of the V and the other towards the other arm of the V, thereby obtaining a better spacing and aeration of the single plants.

Figure 3:
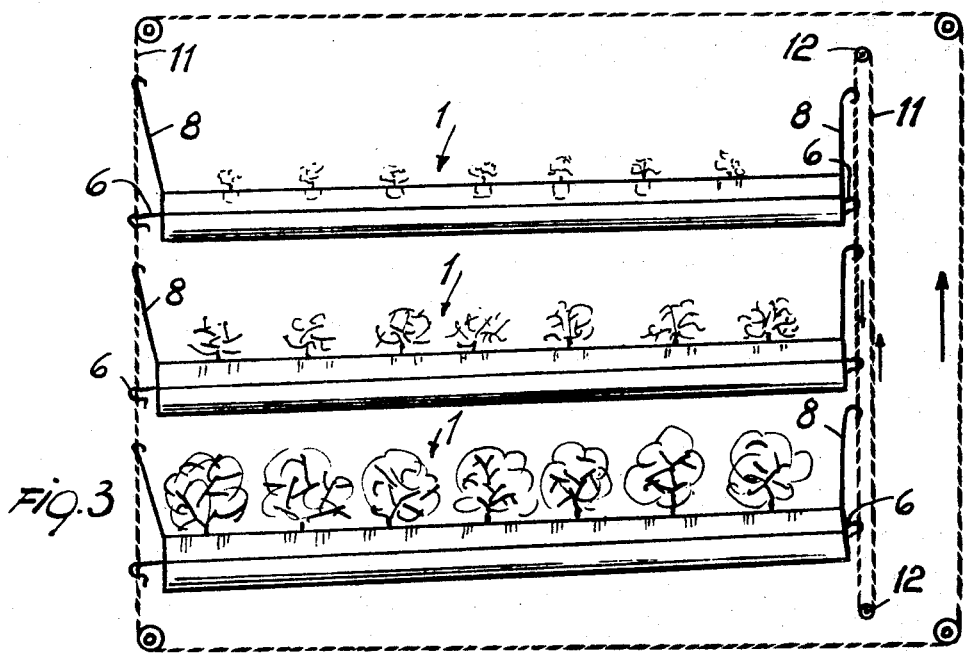
FIG. 3 is an elevational side view of an apparatus according to the invention comprising some tubular structures arranged in vertically spaced rows and in which some pulleys and ropes shown in FIG. 1 have been omitted.

As shown in FIG. 2 in order to transplant the little plants, the wing lips are deformed by spreading them apart. These lips may be provided with fastening means such as male and female parts of press-buttons arranged opposite to one another, or with clips in order to keep normally the lips sufficiently pressed against each other since a good closure is desirable where the little plants extend out the tubular structure. In FIG. 3 the tubular structures are shown slightly inclined to promote a circulation also due to gravity of the nourishing irrigation fluid. In FIG. 3 it is also shown that in the upper zone the younger plants are arranged, while in the lower position there are placed those plants, which are in a more mature vegetation stage when they are in the fruit ripening stage (such as tomatoes). This is a desired feature of the process according to the invention, since the youngest plants need a higher "solar charge" i.e. a better exposure both to the solar beams and possible aerations and the like. The lower rows are in fact partially covered by the shade of the upper rows and are also less aerated and finally the lowermost rows are in a rational position for harvesting and putting the fruits in relative containers.

It was found per example that it is advantageous to arrange the upper line at a height of about 170 cms. from the ground, the intermediate line at about 110 cms. from the ground and the lower line at about 50 cms. from the ground.

Advantageously in the soil below or adjacent to the lowermost row the seeds are caused to germinate and the plant is grown up to such a stage as to have a root system in the lower portion and first branches or leaves in the upper portion. In this way all the space is rationally used.

Advantageously a diameter of 10 cms. for the tubular structures has been found to be quite suitable.

According to the invention the feeding with irrigation is intermittently effected and cycles with a different distribution of the feeding and break periods depending upon the season (there exists a variation between the summer and winter period, bearing in mind that this kind of cultivation is suitable for continued cycles throughout the year), the room humidity level and temperatures. More particularly, according to the invention a timer sets the irrigation and break periods. Advantageous irrigation periods are in the range of 3 to 5 minutes, i.e. 3 to 60 times shorter then the break periods (15 minutes in hot hours during the day up to 180 minutes in cold hours during the night), this result being obtained also due to the fact that all the solution intensely impregnates the root system without pre-impregnation zones or surfaces. While the hydroponic systems temperatures in the range of 15° to 20° C. are suggested for the irrigation fluid during winter time and of 20° to 26° C. during summer time, it was found that in plants according to the invention it is advantageous to heat the fluid to a temperature of about 27° C.

It was also found suitable to provide tubular structures of about 5 ms. in length which extend one behind the other from north to south arranged at a distance per example of 60 ms. in order to define service passageways, the aligned tubular structures forming rows 20 ms. long. Between two adjacent lines (each line being formed by a pair of the type illustrated in FIG. 1) a distance exists per example slightly lower than 1 meter.

In order to eliminate the drawbacks due to algae germination in open channels exposed to the light it was found suitable to cause the fluid (a solution containing suitable fertilizers, salts and other nutrient elements) to be fed via closed and opaque pipes made of e.g. plastics material, from which flexible also opaque, closed pipes branch off generally indicated at 17 in FIG. 2. For the same reasons the tubular structures should be dark and opaque although they may have a reflecting appearance (such as aluminized) at the lower portion thereof in order to increase the luminosity towards the plants below.

The piping are fed by pumps connected to suitable tanks where the nourishing mixture is formed. While in the hydroponic cultivation it is found to be necessary an amount of 15 liters of fluid or solution for each $m^2$ of system, which is equivalent to 2.1 liters for each plant, in the process according to the invention is suggested the use of 1.25 liters per plant and a plant density of 12 plants per square meter.

A suitable slope is 4 percent with respect to a horizontal line for tubular frames in order to facilitate circulation due to gravity with a slowness enough to impregnate and nourish the plant. The tubular frames are fed in parallel from a collector arranged on the north side.

I claim:

1. An apparatus for the hydroponic cultivation of vegetables including substantially horizontal tubular structures for holding therein transplanted plants, pipe means connected with said tubular structures for feeding therein a nutrient solution for the plants and adjustable supporting means for adjustably supporting said tubular structure, wherein, according to the improvement, each tubular structure comprises a trough-like member of substantially rigid material having two longitudinally extending substantially parallel, spaced apart edges, and resiliently deformable lid members secured on said edges, the lid members of each tubular structure having lip-like free ends thereof resting against each other thereby to cover said trough-like members and yieldably hold the plants therebetween.

2. An apparatus according to claim 1, wherein said lid members have forked rims adapted to receive therein said longitudinal edges of said trough-like member.

3. An apparatus according to claim 1, wherein said lid-members have removable fastening means for pressing the lips against each other.

4. An apparatus according to claim 1 wherein said adjustable supporting means comprise vertically movable rope-like elements, vertically extending and arranged at regular intervals along said tubular structures, bracket-like wire elements having each a semicircular portion in which said trough-like members are received, said bracket-like wire elements being arranged at regular intervals along said tubular structures and having each an extension of said semi-circular portion thereof terminating with a hook shaped end engaging the respective rope-like element, V-antenna-like wire elements arranged above said bracket-like wire elements at regular intervals, said V-antenna-like elements having at least one end thereof hook shaped and engaging the respective vertical rope-like element.

5. An apparatus according to claim 4, further comprising a net supported on said V-antenna-like elements and adapted to assume the V-shape thereof.

* * * * *